US012586597B2

(12) United States Patent
Bittner et al.

(10) Patent No.: US 12,586,597 B2
(45) Date of Patent: Mar. 24, 2026

(54) ENHANCED AUDIO FILE GENERATOR

(71) Applicant: Spotify AB, Stockholm (SE)

(72) Inventors: Rachel Malia Bittner, Paris (FR); Jan Van Balen, Leuven (BE); Daniel Stoller, Bonn (DE); Juan José Bosch Vicente, Paris (FR)

(73) Assignee: Spotify AB, Stockholm (SE)

( * ) Notice: Subject to any disclaimer, the term of this patent is extended or adjusted under 35 U.S.C. 154(b) by 521 days.

(21) Appl. No.: 17/934,906

(22) Filed: Sep. 23, 2022

(65) Prior Publication Data

US 2024/0105203 A1 Mar. 28, 2024

(51) Int. Cl.
*G10L 21/00* (2013.01)
*G10L 13/047* (2013.01)
(Continued)

(52) U.S. Cl.
CPC ........ *G10L 21/0264* (2013.01); *G10L 13/047* (2013.01); *G10L 25/03* (2013.01); *G10L 25/30* (2013.01); *G10L 25/51* (2013.01)

(58) Field of Classification Search
None
See application file for complete search history.

(56) References Cited

U.S. PATENT DOCUMENTS 9,536,540 B2 * 1/2017 Avendano ........... G10L 21/0272
9,886,966 B2 * 2/2018 Dusan ..................... G10L 15/20
(Continued)

FOREIGN PATENT DOCUMENTS

CN 113160844 A 7/2021
CN 113593594 A 11/2021
(Continued)

OTHER PUBLICATIONS

Dunning, Kelly, "How to use noise gator software noise cancellation", located at: https://krisp.ai/blog/noise-gate-software/, published Oct. 6, 2021, 12 pages.
(Continued)

*Primary Examiner* — Shreyans A Patel
(74) *Attorney, Agent, or Firm* — McDonnell Boehnen Hulbert & Berghoff LLP

(57) ABSTRACT

This disclosure is directed to an enhanced audio file generator. One aspect is a method of enhancing input speech in an input audio file, the method comprising receiving the input audio file representing the input speech, wherein the input audio file is recorded at an audio recording device, and generating an enhanced audio file by applying an audio transformation model to the input audio file, wherein applying the audio transformation model to generate the enhanced audio file comprises extracting parameters defining audio features from the input audio file, the parameters including a noise parameter defining noise in the input audio file and one or more other preset parameters respectively defining other audio features, synthesizing clean speech based on the extracted parameters including the noise parameter, wherein synthesizing the clean speech comprises transforming the noise parameter to defined value(s); and generating the enhanced audio file with the synthesized clean speech.

20 Claims, 11 Drawing Sheets

(51) Int. Cl.

| | |
|---|---|
| ***G10L 21/0264*** | (2013.01) |
| ***G10L 25/03*** | (2013.01) |
| ***G10L 25/30*** | (2013.01) |
| ***G10L 25/51*** | (2013.01) |

(56) References Cited

U.S. PATENT DOCUMENTS

| | | | | |
|---|---|---|---|---|
| 2016/0255446 | A1 * | 9/2016 | Bernardi | G06F 18/214 381/318 |
| 2021/0125629 | A1 | 4/2021 | Bryan | |
| 2021/0241780 | A1 | 8/2021 | Quillen | |
| 2022/0180886 | A1 * | 6/2022 | Weng | G10L 21/0208 |

FOREIGN PATENT DOCUMENTS

| | | | | | |
|---|---|---|---|---|---|
| CN | 113963713 | A | * | 1/2022 | |
| CN | 114464207 | A | * | 5/2022 | G10L 15/02 |
| CN | 114495968 | A | * | 5/2022 | |
| CN | 114512140 | A | | 5/2022 | |
| CN | 114582328 | A | * | 6/2022 | |
| CN | 115019815 | A | * | 9/2022 | |
| CN | 115171712 | A | * | 10/2022 | |
| CN | 117012218 | A | * | 11/2023 | |
| CN | 110660403 | B | * | 3/2024 | G10L 21/0208 |
| EP | 4233046 | B1 | * | 7/2024 | G10L 15/063 |

OTHER PUBLICATIONS

Accusonus, "How to use noise gator software noise cancellation", located at: https://accusonus.com/products/audio-repair/era-bundle, published May 3, 2021, 52 pages.

Watcharasupat, Kar et al., "End-to-end complex-valued multidilated convolutional neural network for joint acoustic echo cancellation and noise suppression", arXiv:2110.00745v3 [eess.AS], Jan. 22, 2022, 5 pages.

Weninger, Felix et al., "Speech enhancement with LSTM recurrent neural networks and its application to noise-robust ASR", LVA/ICA 2015: Proceedings of the 12th International Conference on Latent Variable Analysis and Signal Separation, vol. 9237, Aug. 2015, pp. 91-99.

European Extended Search Report in Application 23191912.7, mailed Dec. 20, 2023, 58 pages.

Li Dengshi et al., "Adaptive speech intelligibility enhancement for far-and-near-end noise environments based on self-attention StarGAN", in: Proc. Multimedia Modeling, LNCS, Jun. 6, 2022, Springer Intl. Publishing, XP0931111128, vol. 13142, pp. 205-217.

European Examination Report, European Patent Application No. 23191912.7, mailed Jul. 2, 2025.

* cited by examiner

ENHANCED AUDIO FILE GENERATOR

BACKGROUND

In order to produce high quality voice recordings, a professional studio with professional audio equipment is generally needed. The studio can be sound proofed to reduce background noise. The audio equipment can include a professional quality microphone, a pop filter, a multi-channel recorder, audio mixing and equalizing hardware, a good computer, headphones, etc. Many people do not have access to such equipment.

SUMMARY

In general terms, this disclosure is directed to an enhanced audio file generator. In some embodiments, an audio transformation model receives an input audio file representing speech and outputs an enhanced audio file with synthesized clean speech. In many embodiments, one or more machine learning models are used to transform an audio file to enhance the sound quality of the recording.

One aspect is a method of enhancing input speech in an input audio file, the method comprising receiving the input audio file representing the input speech, wherein the input audio file is recorded at an audio recording device and generating an enhanced audio file by applying an audio transformation model to the input audio file, wherein applying the audio transformation model to generate the enhanced audio file comprises extracting parameters defining audio features from the input audio file, the parameters including (i) a noise parameter defining noise in the input audio file and (ii) one or more other preset parameters respectively defining other audio features, synthesizing clean speech based on the extracted parameters including the noise parameter, wherein synthesizing the clean speech comprises transforming the noise parameter to at least one defined value, and generating the enhanced audio file with the synthesized clean speech.

Another aspect is a method of enhancing input speech in an input audio file, the method comprising receiving the input audio file representing the input speech, wherein the input audio file is recorded at an audio recording device and generating an enhanced audio file by applying an audio transformation model to the input audio file, wherein applying the audio transformation model to generate the enhanced audio file comprises mapping the input audio file to a latent vector of audio features, wherein the audio transformation model comprises a transformation module that is trained to perform the mapping of the input audio file to the latent vector based on a decoder being enabled to synthesize clean speech from the latent vector, synthesizing the clean speech by applying the decoder to the latent vector, and generating the enhanced audio file with the synthesized clean speech.

Yet another aspect is an audio recording device comprising a processor in communication with a microphone, and a memory storing instructions, which when executed by the processor cause the audio recording device to record an input audio file to capture speech via the microphone, and generate an enhanced audio file by applying an audio transformation model to the input audio file, wherein to generate the enhanced audio file by applying the audio transformation model includes to extract parameters defining audio features from the input audio file, the parameters including (i) a noise parameter defining noise in the input audio file and (ii) one or more other preset parameters respectively defining other audio features, synthesize clean speech based on the extracted parameters including the noise parameter, wherein to synthesize the clean speech comprises transforming the noise parameter to at least one defined value, and generate the enhanced audio file with the synthesized clean speech.

Another aspect is an audio recording device comprising a processor in communication with a microphone, and a memory storing instructions, which when executed by the processor cause the audio recording device to record an input audio file to capture speech via the microphone and generate an enhanced audio file by applying an audio transformation model to the input audio file, wherein to generate the enhanced audio file by applying the audio transformation model includes to map the input audio file to a latent vector of audio features, wherein the audio transformation model comprises a transformation module that is trained to map the input audio file to the latent vector based on a decoder being enabled to synthesize clean speech from the latent vector, synthesize the clean speech by applying the decoder to the latent vector, and generate the enhanced audio file with the synthesized clean speech.

Yet another aspect is a non-transitory computer-readable medium storing instructions which, when executed by one or more processors, cause the one or more processors to perform receiving an input audio file representing input speech, wherein the input audio file is recorded at an audio recording device, and generating an enhanced audio file by applying an audio transformation model to the input audio file, wherein applying the audio transformation model to generate the enhanced audio file comprises extracting parameters defining audio features from the input audio file, the parameters including (i) a noise parameter defining noise in the input audio file and (ii) one or more other preset parameters respectively defining other audio features, synthesizing clean speech based on the extracted parameters including the noise parameter, wherein synthesizing the clean speech comprises transforming the noise parameter to at least one defined value, and generating the enhanced audio file with the synthesized clean speech.

Another aspect is a non-transitory computer-readable medium storing instructions which, when executed by one or more processors, cause the one or more processors to perform receiving an input audio file representing the input speech, wherein the input audio file is recorded at an audio recording device and generating an enhanced audio file by applying an audio transformation model to the input audio file, wherein applying the audio transformation model to generate the enhanced audio file comprises mapping the input audio file to a latent vector of audio features, wherein the audio transformation model comprises a transformation module that is trained to perform the mapping of the input audio file to the latent vector based on a decoder being enabled to synthesize clean speech from the latent vector, synthesizing the clean speech by applying the decoder to the latent vector, and generating the enhanced audio file with the synthesized clean speech.

BRIEF DESCRIPTION OF THE DRAWINGS

In general terms, this disclosure is directed to an enhanced audio file generator. Various embodiments will be described in detail with reference to the drawings, wherein like reference numerals represent like parts and assemblies throughout the several views.

DETAILED DESCRIPTION

Figure 1:
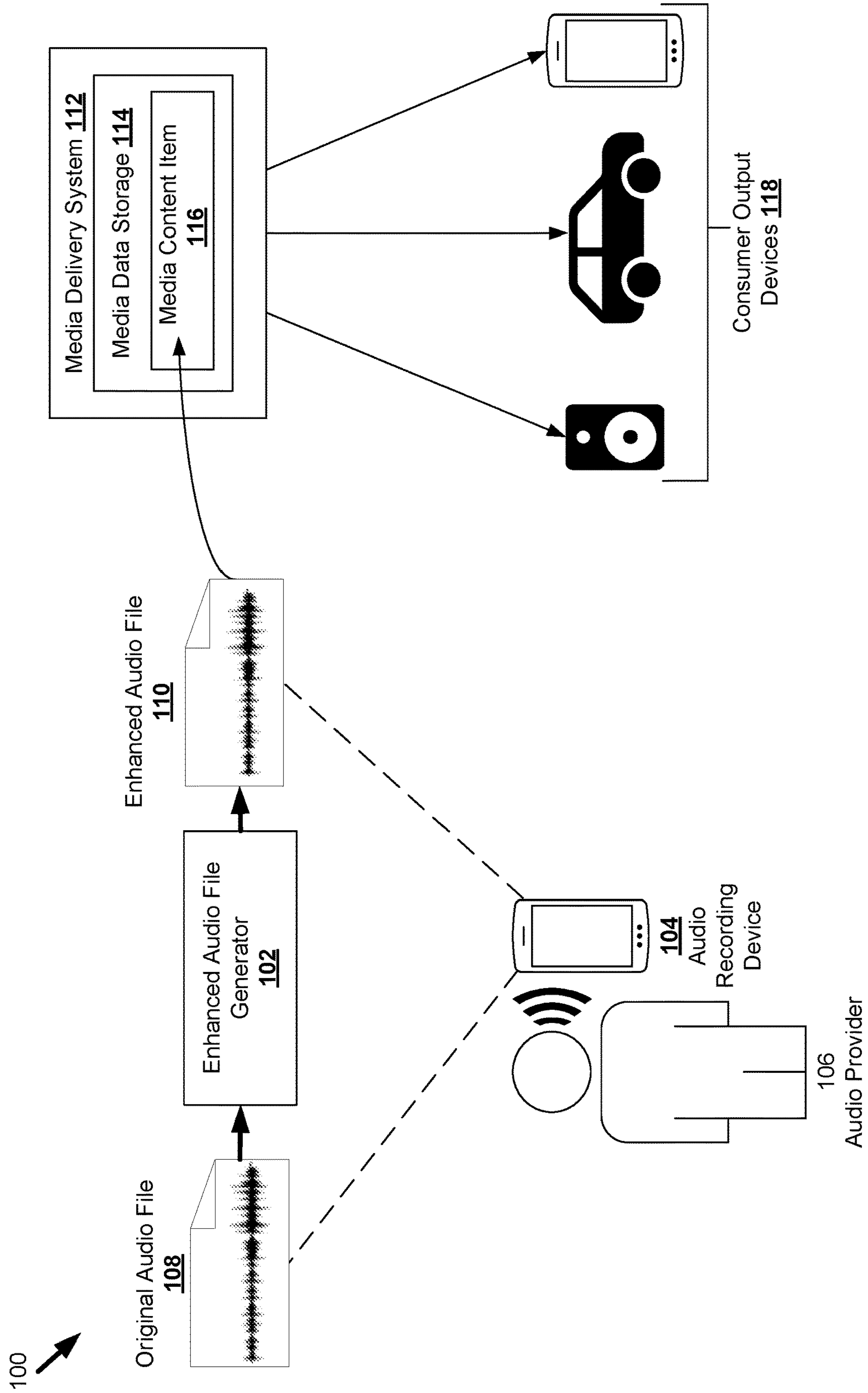
FIG. 1 illustrates an example environment for an enhanced audio file generator.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, this disclosure is directed to an enhanced audio file generator. In many embodiments, a single machine learning model is used to transform an audio file to enhance the sound quality of the recording. In some embodiments, the method and systems disclosed herein allow users to record high quality voice recordings without using professional equipment. For example, a user can generate an original audio file on a mobile phone microphone or a connected Bluetooth headset. This original audio file is processed to extract features which are used to generate an enhanced audio file. In some embodiments, the enhanced audio file mimics features which are present in a professionally recorded and mixed audio file.

In some embodiments, the model for generating an enhanced audio file is computationally inexpensive and efficient allowing the model to run completely on the recording device (e.g., mobile device with a microphone) in real time. Additionally, the model for generating an enhanced audio file can be used in many different use cases such as: (1) a user recording a podcast, (2) a user recording an audio clip to interact with a podcast, artist, or other user, (3) a user recording an audio advertisement, and/or (4) speech recognition. Many other applications of the model for generating an enhanced audio file are discussed herein.

FIG. 1 illustrates an example environment 100 for an enhanced audio file generator 102. In the embodiment shown, the enhanced audio file generator 102 is executed on the audio recording device 104. The audio recording device 104 records audio from the audio provider 106 (e.g., recording the voice of a user of the audio recording device 104). An original audio file 108 recorded by the audio recording device 104 is provided to the enhanced audio file generator 102 to generate an enhanced audio file 110. In some embodiments, the enhanced audio file 110 is uploaded via a network (e.g., the Internet) to a media delivery system 112 where it is stored in a media data storage 114 as a media content item 116. The media delivery system 112 operates to provide the media content item 116 among other media content items to various consumer output devices 118, for example as part of a music streaming platform.

The audio recording device 104 is a device with hardware and software components capable of recording audio. In some embodiments, the audio recording device 104 is a single device (e.g., a smartphone). In some embodiments, the audio recording device 104 is connected either wired or wirelessly to a device with a microphone. For example, a computing system connected to a microphone, or a smart phone connected to headphones having a microphone. In typical embodiments, the audio recording device 104 includes a processor which is in communication (integrated, wired, or wirelessly) with at least one microphone, and in electrical communication with a memory which stores instructions to perform various embodiments disclosed herein. Additionally, the audio recording device 104 includes a network interface and hardware to communicate with the media delivery system 112. In some embodiments, the memory stores instructions to cause the audio recording device 104 to perform the applications of the enhanced audio file generator 102 described herein.

The audio provider 106 is a user who generates the audio. In many of the embodiments described herein the audio provider 106 generates speech which is recorded. However, the systems and methods herein operate similarly for any type of audio. For example, the audio could be music from the audio provider's voice, an instrument, or a speaker. In other examples, the audio may be environmental noise (e.g., the sounds recorded at a park, beach, construction site, or any other location. Examples of types of content recorded include, podcasts, speech clips (e.g., speech clips responding/interacting with a podcast), and audio advertisements.

The original audio file 108 is an audio file which stores data recorded by the audio recording device 104. The systems and methods disclosed herein can be implemented using any of a variety of audio file formats. In some embodiments, the original audio file 108 is a waveform (WAV) audio file format file. In some embodiments, an audio recording device records audio from an audio provider in a WAV format. In other embodiments, the audio recording device first records the file in another format, such as MP3 and converts this file to the WAV audio file format. In some embodiments, different audio file formats can be used depending on the capabilities of the audio recording device 104.

The enhanced audio file generator 102 operates to process the original audio file 108 and generates or transforms the original audio file 108 into the enhanced audio file. In some embodiments, the enhanced audio file generator 102 uses parameterized voice transformation as illustrated and described in reference to FIGS. 2 through 5. In some embodiments, the enhanced audio file generator 102 uses latent voice transformation as illustrated and described in reference to FIGS. 6 through 9. Additionally, the enhanced audio file generator 102 can use any combination of the parameterized voice transformation and latent voice transformation.

The enhanced audio file 110 is generated by the enhanced audio file generator 102. In some embodiments, an audio transformation model is applied to the original audio file 108 to generate the enhanced audio file 110. In some embodiments, the enhanced audio file 110 is generated based on extracted features from the original audio file 108. In some of these embodiments, the enhanced audio file 110 is generated without directly referencing the original audio file 108. For example, the enhanced audio file may be generated based on features extracted from the original audio file 108 without referencing the original audio file. In some embodiments, the enhanced audio file 110 mimics features which are present in a professionally recorded and mixed audio file.

In some embodiments, the enhanced audio file 110 is temporarily stored on the audio recording device 104. In some embodiments, the enhanced audio file 110 is permanently stored on the audio recording device 104. In some examples, a user records audio which is not initially uploaded to the media delivery system 112 because the user is not yet ready to share/publish yet the recorded audio. In some examples, a user may compile multiple enhanced audio files as part of the creation process for a media content item. In some embodiments, allowing a user to temporarily or permanently store the enhanced audio file 110 reduces the amount of data transferred between the audio recording device 104 and the media delivery system 112.

The media delivery system 112 operates to provide media content to the consumer output devices 118. In the example shown, the media delivery system 112 further operates to receive an enhanced audio file 110 uploaded from the audio recording device 104. In some examples, the enhanced audio file 110 is a podcast which is uploaded to the media delivery system 112 so that it can be shared and played among the consumer output devices 118. In many embodiments, the media delivery system 112 includes multiple servers which may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., services to enhance media content playback during travel, etc.). Various combinations thereof are possible as well.

The media data storage 114 stores media content items. Examples of media content include audio content (e.g., songs, albums, podcasts, audio advertisements etc.). Many other examples of audio content are included within the scope of this disclosure including video content (e.g., the enhanced audio file 110 can be presented as the audio output for video content etc.).

The media content item 116 is, or includes at least a portion of, the enhanced audio file 110 uploaded to the media delivery system. In some embodiments, the media content item 116 content item is a podcast or segment to be inserted into a podcast. In other examples, the media content item 116 is an advertisement audio segment. In some embodiments, the audio provider can set the media content item 116 as private. In some embodiments, the audio provider 106 can publish the media content item to the audio providers account to share the media content item 116. The consumer output devices 118 typically include one or more processors, a memory storing an application to perform various features including some of the features described herein and a speaker to output media content. The consumer output devices 118 can include a variety of I/O devices, computing devices, and software modules (including a software module for an operating system and software modules for interacting with and presenting media content).

The consumer output devices 118 are media playback devices which received media content items, including the media content item 116 from the media delivery system 112. Examples of consumer output devices 118 include smartphones, tablets, smart speakers, car audio systems, and other computing devices. In some embodiments, the audio recording device 104 is one of the consumer output devices 118. For example, the user recording audio may also consume the media content item on the audio recording device 104.

In some embodiments, the audio recording device 104 operates with the media delivery system 112 for training a model or models included in the enhanced audio file generator. In some embodiments, media content items with a high likelihood of clean speech segments are identified for training the model. For example, podcasts with lots of downloads, artwork, and many episodes are likely to have high quality clean speech segments. In some embodiments, these media content items are identified using a heuristic. The identified media content items are segmented into a plurality of segments and classified based on whether the segment includes music, speech, noise etc. The segments classified as containing clean speech are used as training examples for the audio transformation model. For example, using the techniques illustrated and described in FIGS. 2-4. In some embodiments, the segments that are classified as noisy or as containing music are added back in as negative training examples.

1. Parameterized Voice Transformation

Figure 2:
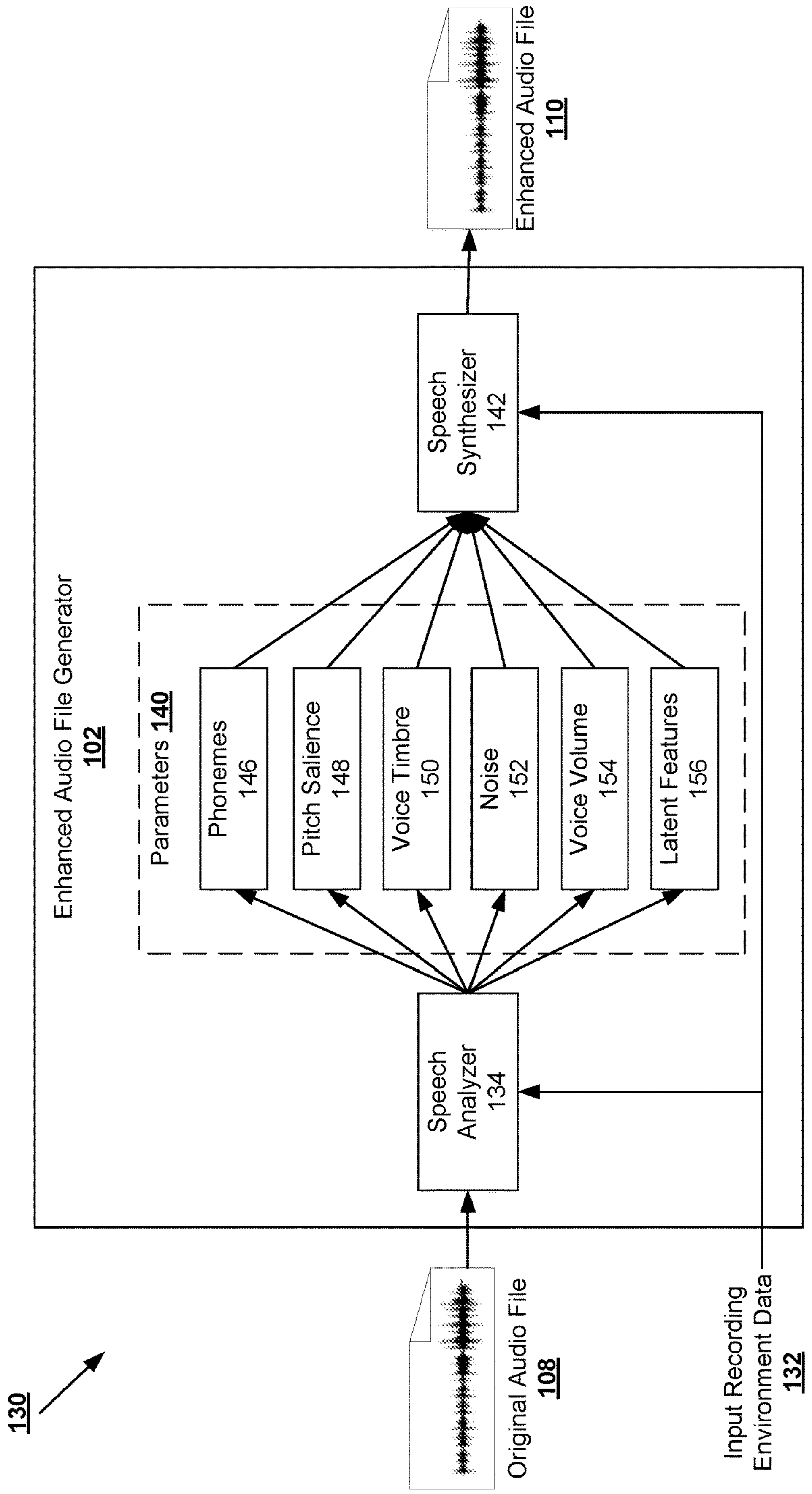
FIG. 2 illustrates an example architecture for an enhanced audio file generator using parameterized voice transformation.

FIG. 2 illustrates an example architecture 130 for an enhanced audio file generator 102 using parameterized voice transformation. The enhanced audio file generator receives an original audio file 108 and (optionally) input recording environment data 132 and outputs an enhanced audio file 110. The enhanced audio file generator 102 includes a speech analyzer 134 which decodes the original audio file 108 to extract the parameters 140. The parameters can include various audio features extracted from the original audio file 108 including any combination of phonemes 146, pitch salience 148, voice timbre 150, noise 152, voice volume 154, and latent features 156. The parameters 140 are provided to the speech synthesizer 142 which processes the parameters 140 to generate the enhanced audio file 110.

Examples of the original audio file 108 and the enhanced audio file 110 are illustrated and described in reference to FIG. 1.

The input recording environment data 132 includes data which supplements the original audio file 108. For example, the input recording environment data 132 can include information related to how the original audio file 108 was recorded, such as the type of device the original audio file 108 was recorded on, a type of microphone, a connection type of the microphone (e.g., integrated, wired, or wireless), etc. In some embodiments, the input recording environment data 132 includes data such as user account data associated with the original audio file, a location where the original audio file was recorded, whether the original audio file 108 was recorded in a professional studio, metadata associated with the original audio file 108, etc. In some embodiments, the input recording environment data 132 is automatically generated. For example, the audio recording device may include an application which determines system information of the audio recording device, information of connected devices, user account information, device location information, or any combination thereof to automatically generate the input recording environment data 132. In other embodiments, some or all of the input recording environment data 132 is manually provided by a user.

The speech analyzer 134 extracts parameters 140 from the original audio file 108. In some embodiments, the parameters 140 are preset parameters that correspond to audio features. In some embodiments, the speech analyzer 134 uses a neural network to extract some or all of the parameters 140 from the original audio file 108. In some embodiments, the speech analyzer 134 is trained to extract the parameters 140. In some embodiments, the speech analyzer 134 is trained to extract the parameters which produce individual components, one for each feature, and summing the components.

In some embodiments, the parameters 140 are preset parameters that correspond to audio features which the speech analyzer 134 is trained to identify and calculate. In some embodiments, the parameters are transformed to provide a desired effect. For example, the parameters 140 can be transformed to match or mimic features in professionally recorded and mixed audio. For example, the noise 152 can be transformed to zero to generate clean speech in the enhanced audio file 110.

In some embodiments, the parameters 140 include any combination of phonemes 146, pitch salience 148, voice timbre 150, noise 152, voice volume 154, and latent features 156. Phonemes 146 includes perceptually distinct units of sound. Pitch Salience 148 includes a measure of tone sensation. In some embodiments, pitch salience 148 includes a measure of the predominance of different frequencies in an audio single at every time frame. Voice Timbre 150 includes a measure of the global sound quality. In some embodiments, noise 152 includes the noise identified in the original audio file. Examples of noise includes background noise. Voice volume includes 154 includes a measure of voice volume at the different time periods in the original audio file. Latent features 156 includes any other features extracted from the speech analyzer. For example, latent features may extract breathing sounds from the original audio file. In some embodiments, the latent features are encoded in a latent vector with a transformation module and decoder trained to map features to the latent vector according to the example embodiment illustrated in FIGS. 4 and 5. In some embodiments, the parameters 140 can be adjusted based on other models to create a desired effect. For example, the pitch salience can be adjusted by the output of another model to create an input speech to output singing effect.

The speech synthesizer 142 generates the enhanced audio file 110 based on the parameters 140. The speech synthesizer 142 reconstructs the enhanced audio file 110 without reference to the original audio file 108. For example, the speech synthesizer 142 can generate the enhanced audio file 110 based only on the parameters 140. In the embodiment shown, the speech synthesizer 142 generates the enhanced audio file 110 based on only the parameters 140 and the input recording environment data 132. An example of the architecture for the speech synthesizer 142 is illustrated and described in FIG. 3.

Figure 3:
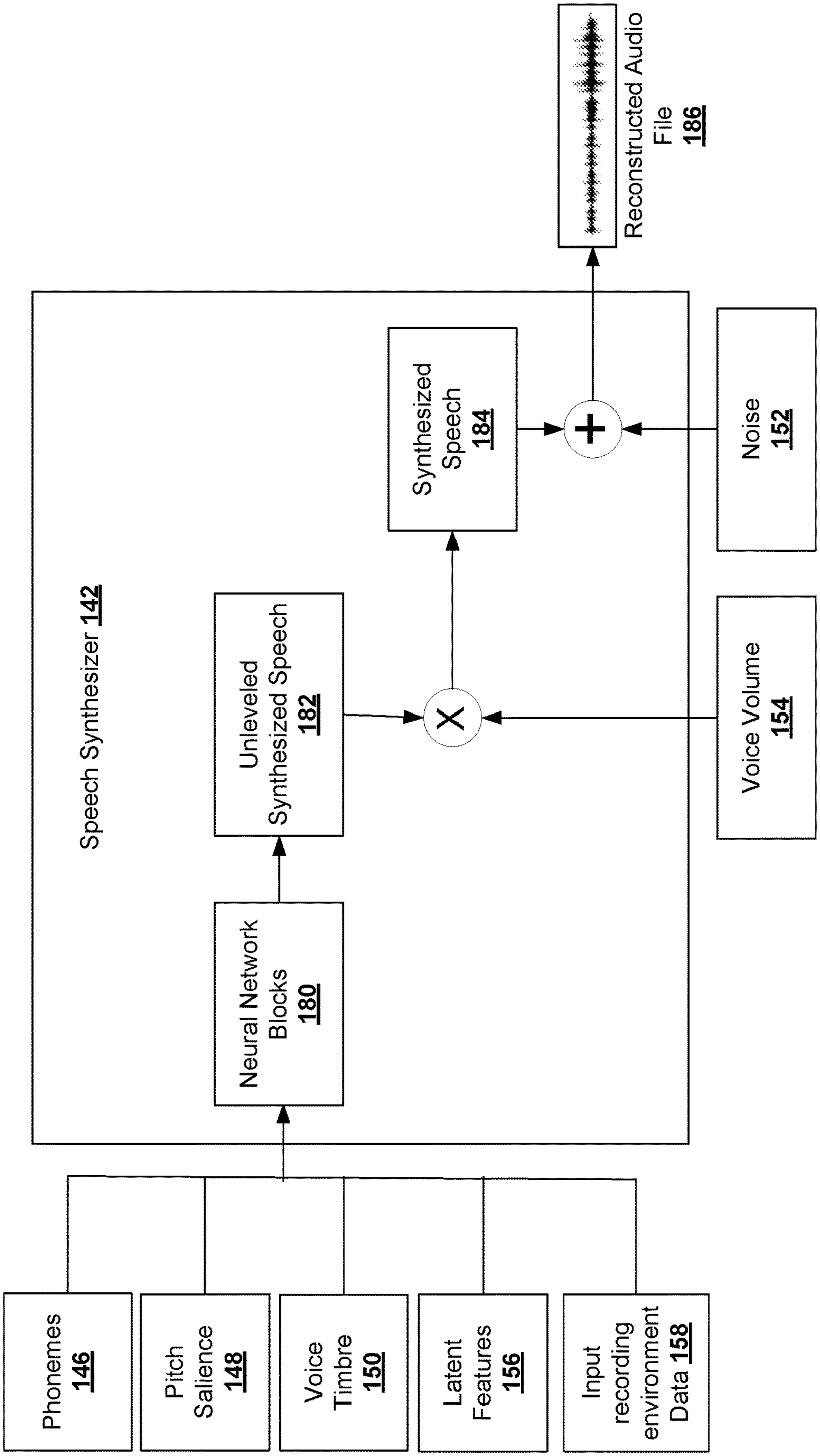
FIG. 3 illustrates an example architecture for a speech synthesizer.

FIG. 3 illustrates an example architecture for a speech synthesizer 142. The speech synthesizer 142 is an example of the speech synthesizer 142 illustrated and described in reference to FIG. 2.

Inputs to the speech synthesizer 142 include phonemes 146, pitch salience 148, voice timbre 150, noise 152, voice volume 154, latent features 156, and input recording environment data 132. Details for these inputs are illustrated and described in reference to FIG. 2. The speech synthesizer 142 outputs a reconstructed audio file 186. In some embodiments, to generate an enhanced audio file (e.g., the enhanced audio file 110 illustrated and described in FIGS. 1 and 2) the noise 152 parameter is set to at least one defined value (e.g., zero, a non-zero constant, or a value that may vary over time), which is inaudible or otherwise deemed acceptable for clean speech, such that the reconstructed audio file includes audio data representing clean speech. For example, the noise 152 parameter can be set to a value which may vary over time but remains inaudible to a user or is otherwise deemed an acceptable level of noise for clean speech.

In typical embodiments, the input recording environment data 132 and voice timbre 150 are global inputs (e.g., inputs which do not vary over time) while phonemes 146, pitch salience 148, noise 152, voice volume 154, and latent features 156 vary over time. In some embodiments, latent features 156 include global features as well as, or instead of, time varying features.

The speech synthesizer 142 includes neural network blocks 180. The neural network blocks 180 use the received inputs as basis to generate the synthesized speech, which may be unleveled as shown in FIG. 3 (e.g., the unleveled synthesized speech 182), based on the received inputs. In some embodiments, the neural network blocks receive any combination of parameters, such as the phonemes 146, pitch salience 148, voice timbre 150, and latent features 156 as well as the input recording environment data 132. which generates unleveled synthesized speech 182. In some embodiments, the neural network blocks 180 are trained using a supervised machine learning technique.

In some embodiments, the voice volume 154 and noise 152 are used as inputs during the training of the neural network blocks 180. In some examples, unleveled speech and/or noise are features which a user would like to remove from a recording. The neural network blocks 180 are trained to generate the unleveled synthesized speech 182. In some embodiments, the unleveled synthesized speech 182 is point-wise multiplied by the extracted voice volume 154 to generate the synthesized speech 184. In some embodiments, noise 152 is added to the (e.g., leveled) synthesized speech 184 to generate the reconstructed audio file 186. In some embodiments, the leveling with the voice volume is option and the noise is added to the synthesized speech (e.g., the unleveled synthesized speech 182) generated by the neural network. In some embodiments, adding the noise 152 to the synthesized speech 184 is done to train the neural network to accurately reconstruct the original audio file without noise. In these embodiments, the noise is added back during the training stage so the reconstructed audio file 186 matches the input file. In some embodiments, the noise 152 is ultimately set to zero once the training is complete and the speech synthesizer 142 is being used to generate clean speech. The reconstructed audio file 186 is then compared to the original audio file. This process repeats until the differences between the reconstructed audio file 186 and the original audio file are below a threshold. At this point, the neural network blocks 180 are trained to generate synthesized speech which is leveled and without noise. In this manner, the speech synthesizer 142 forces the neural network blocks 180 to learn how to generate leveled speech without noise.

In some embodiments, the architecture operates with two paths one path being used to train the neural network blocks 180 (e.g., as described above) and a second path which is used when applying the trained speech synthesizer 142. For example, the trained neural network blocks 180 may directly provide the output reconstructed audio file 186 with clean speech when the trained speech synthesizer 142 is being applied in an application. However, the architecture shown functions as a single path. For example, once the neural network blocks 180 are trained the voice volume 154 input is set to a constant (e.g., a vector of ones) and the noise 152 is set to a constant (e.g., 0). In some embodiments, the noise is set to a non-zero level which is inaudible to a user or otherwise deemed an acceptable level of noise for clean speech. This results in an audio file with enhanced speech being generated as the output. In some embodiments, the noise is assigned a value which may vary over time but remains inaudible to a user or is otherwise deemed an acceptable level of noise for clean speech.

In addition to, or instead of, training the neural network blocks to generate level speech and remove background the other parameters can be used to train the neural network blocks. For example, in some use cases transforming the voice timbre may be desired. In these embodiments, the neural network blocks 180 are trained in a similar manner to the voice volume and background noise. For example, the neural network blocks 180 can be trained to transform voice timbre 150 by receiving three examples of extracted voice timbre from audio samples. Two of the samples may be from a voice with desired voice timbre and the third with a different voice timbre. The neural network blocks 180 are trained until the reconstructed audio file 186 outputs a voice timbre closer to the two examples with the desired voice timbre. In another example, pitch salience can be extracted and reintroduced to the synthesized speech to train the neural network blocks to remove certain pitch salience features. This technique can be repeated for phonemes 146 (e.g., to remove hard "s" or "p" sounds), latent features 156, and input recording environment data 132. In some embodiments, the input recording environment data 132 can be used to train the neural network blocks 180 to remove common abnormalities captured on specific recording devices (e.g., a certain type of microphone may struggle to capture certain frequencies which the neural network blocks 180 can be trained to removed).

In some embodiments, a single model is designed to use a loss function which is the sum of several components. One component is audio reconstruction which is calculated as the mean squared error between the original audio file 108 and the reconstructed audio file 186. A second component is a phoneme component which is calculated by the mean squared error between estimated phonemes and the output of an already trained phoneme estimation model. A third component is a pitch salience component which calculates the mean squared error between the estimated pitch salience and an already trained pitch salience model. A fourth component is a voice timbre component which uses a triplet loss technique which analyzes multiple target samples (typically two) and a negative sample (typically one) and determines whether the reconstructed audio file 186 is closer to the target sample or the negative sample. A fifth component is a noise estimation (e.g., a background noise estimation) which is the mean squared error between the estimated noise and the actual noise. These components are combined to generate a single transformation model. In some embodiments, the date required to train components includes the original audio file and input recording environment data 132. These inputs are used over several training traces to generate the following outputs: (1) synthesized speech; (2) noise; (3) a pitch salience neural network on the synthesized clean speech; (4) output from a phoneme estimation model on the synthesized speech; (5) a second synthesized speech sample from same recording; and (6) a sample from a different recording.

Figure 4:
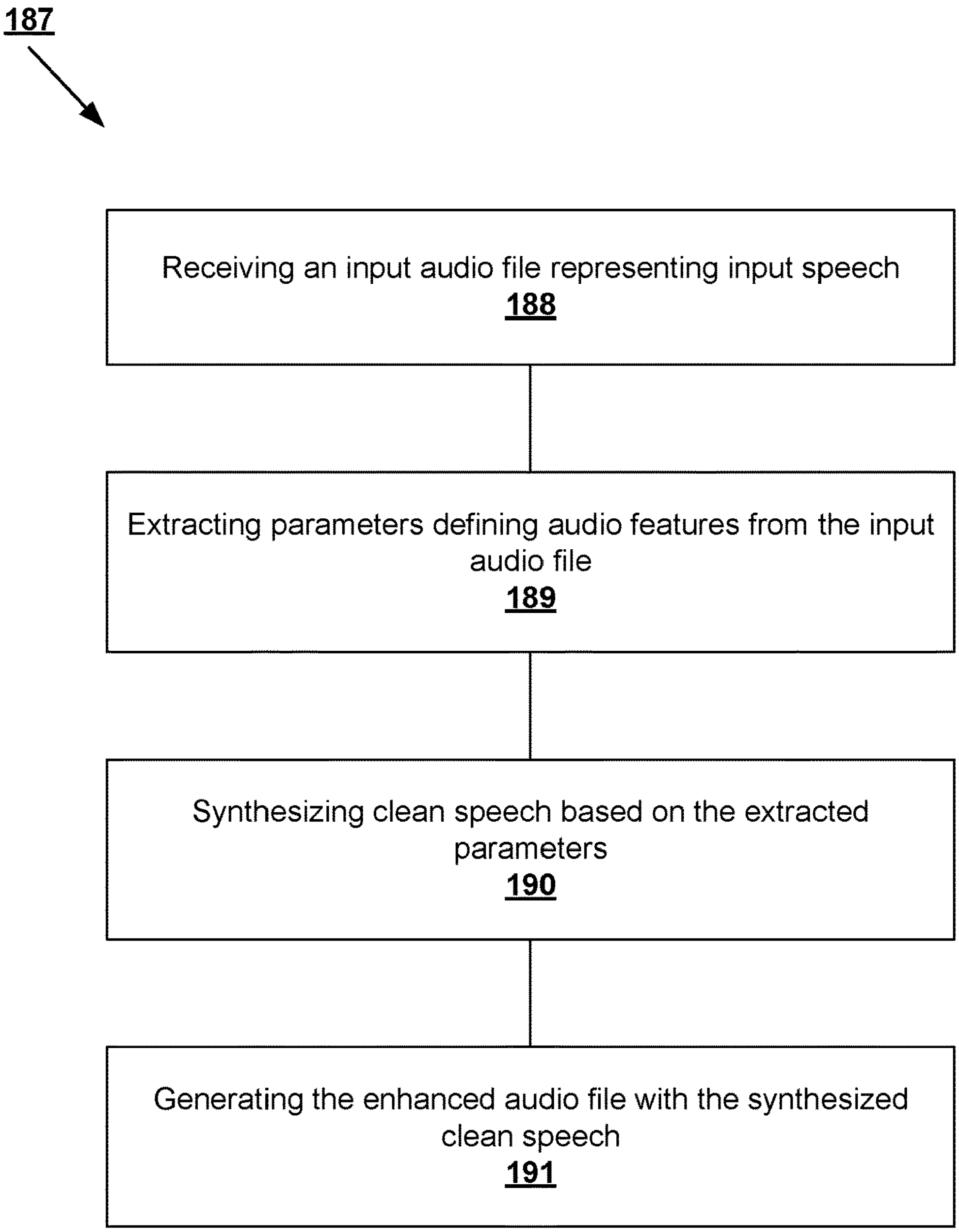
FIG. 4 illustrates an example method of enhancing input speech in an input audio file.

FIG. 4 illustrates an example method 187 of enhancing input speech in an input audio file. The method 187 includes the operations 188, 189, 190, and 191.

The operation 188 receives an input audio file representing input speech. In some embodiments, the input audio file is recorded at an audio recording device. In some embodiments, the method 187 receives and processes the input audio file in real-time as the user is recording speech at the audio recording device.

In some embodiments, the operations 189, 190, and 191 are part of a step for generating an enhanced audio file by applying an audio transformation model to the input audio file. In some embodiments, the audio transformation model is trained using the method 192 illustrated and described in reference to FIG. 5.

The operation 189 extracts parameters defining audio features from the input audio file. In some embodiments, the parameters include a noise parameter defining noise in the input audio file and one or more other preset parameters respectively defining other audio features. In some embodiments, the one or more other preset parameters respectively define one or more of phonemes, pitch salience, voice timbre, voice volume, or any combination thereof. In some embodiments, the operation 189 further determines input recording environment data from the audio recording device.

The operation 190 synthesizes clean speech based on the extracted parameters. In some embodiments, the extracted parameters include a noise parameter and synthesizing the clean speech includes transforming the noise parameter to at least one defined value. In some embodiments, the at least one defined value is set to zero causing the noise to inaudible. Alternatively, the noise parameter can be set to a non-zero level which is inaudible to a user or otherwise deemed an acceptable level for clean speech. In some embodiments, the clean speech is synthesized using a neural network. In some embodiments, the clean speech is synthesized without referencing the input audio file. In some embodiments, the audio transformation model accounts for input recording environment data of the audio recording device.

The operation 191 generates the enhanced audio file with the synthesized clean speech. In some embodiments, the enhanced audio file is generated without referencing the input audio file. In some embodiments, the enhanced audio file is the enhanced audio file 110 illustrated and describe in reference to FIGS. 1 and 2.

In some embodiments, an audio recording device comprising, a processor in communication with a microphone and a memory storing instructions, which when executed by the processor cause the audio recording device to perform the method 195. In some embodiments, the method 195 is performed entirely on the audio recording device. In some embodiments, the method 195 is performed in real-time as a user records audio at the audio recording device. In some embodiments, A non-transitory computer-readable storing instructions which, when executed by one or more processors, cause the one or more processors to perform the method 187.

Figure 5:
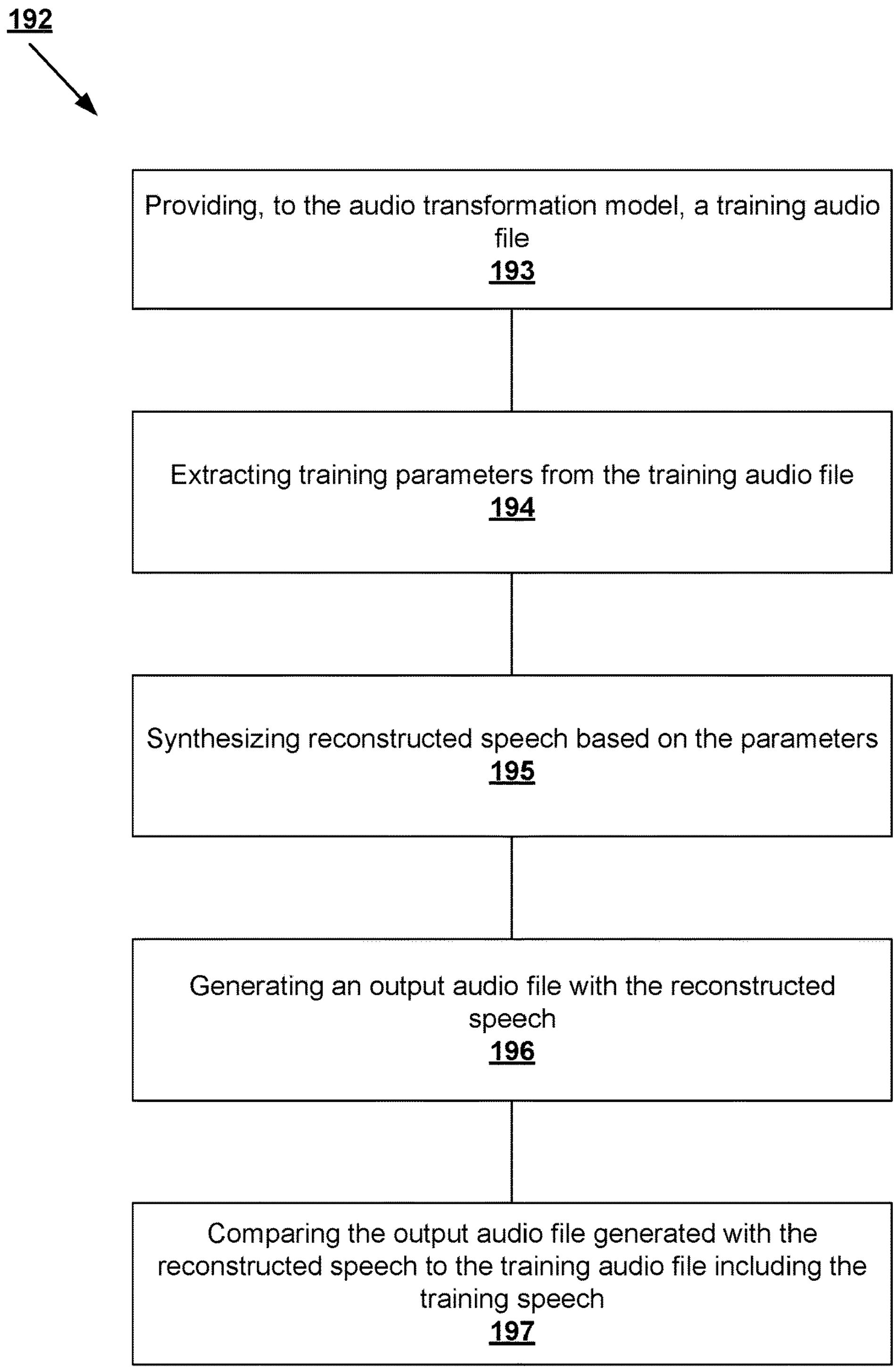
FIG. 5 illustrates an example method for training an audio transformation model.

FIG. 5 illustrates an example method 192 for training the audio transformation model. In some embodiments, the method 192 is used to train a neural network to synthesize clean speech based on preset parameters for audio features as part of the speech synthesizer 142 as shown in FIGS. 2 and 3. The method 192 includes the operations 193, 194, 195, 196, and 197.

The operation 193 receives a training audio file. The training audio file includes audio data representing training speech. In some embodiments, the training audio file includes noise and a corresponding target audio file is not required or used in the training of the audio transformation model.

The operation 194 extracts training parameters from the training audio file. In some embodiments, the training parameters include a noise parameter defining noise in the training audio file. In some embodiments, the noise includes background noise detected in the audio file.

The operation 195 synthesizes reconstructed speech. In some embodiments the reconstructed speech is synthesized using a neural network. In some embodiments, the different preset parameters correspond to several components which the neural network receives as inputs to synthesizes the reconstructed speech.

The operation 196 generates an output audio file with the reconstructed speech. In some embodiments, the noise parameter is added included in the output audio file with the reconstructed speech. This trains the neural network to reconstruct the speech without the noise, such that when the noise is added back into the output audio file the output audio file will match the training audio file when the neural network reconstructs speech without noise.

The operation 197 compares the output audio file generated with the reconstructed speech to the training audio file including the training speech. This comparison is used to train and further refine the neural network to synthesize clean speech.

Advantages of the parameterized voice transformation architecture illustrated and described in reference to FIGS. 2 through 5 include: (1) generating a single model which transforms an original audio file to an enhanced audio file based on any of a variety of parameters, (2) the single model is computationally inexpensive so a user can download the model at a mobile computing device allowing a user to generate the enhanced audio file without uploading audio to a server, (3) the single model can process audio in real time on many different features with one click; (4) the model can be generated on any corpus of training data (no need to for paired clean/noisy speech training samples). Because, in some embodiments, the single model can be downloaded and run on a user device the enhanced audio can be generated anywhere (e.g., at locations with no network connectivity) and/or without the privacy concerns of uploading speech to a server.

2. Latent Voice Transformation

Figure 6:
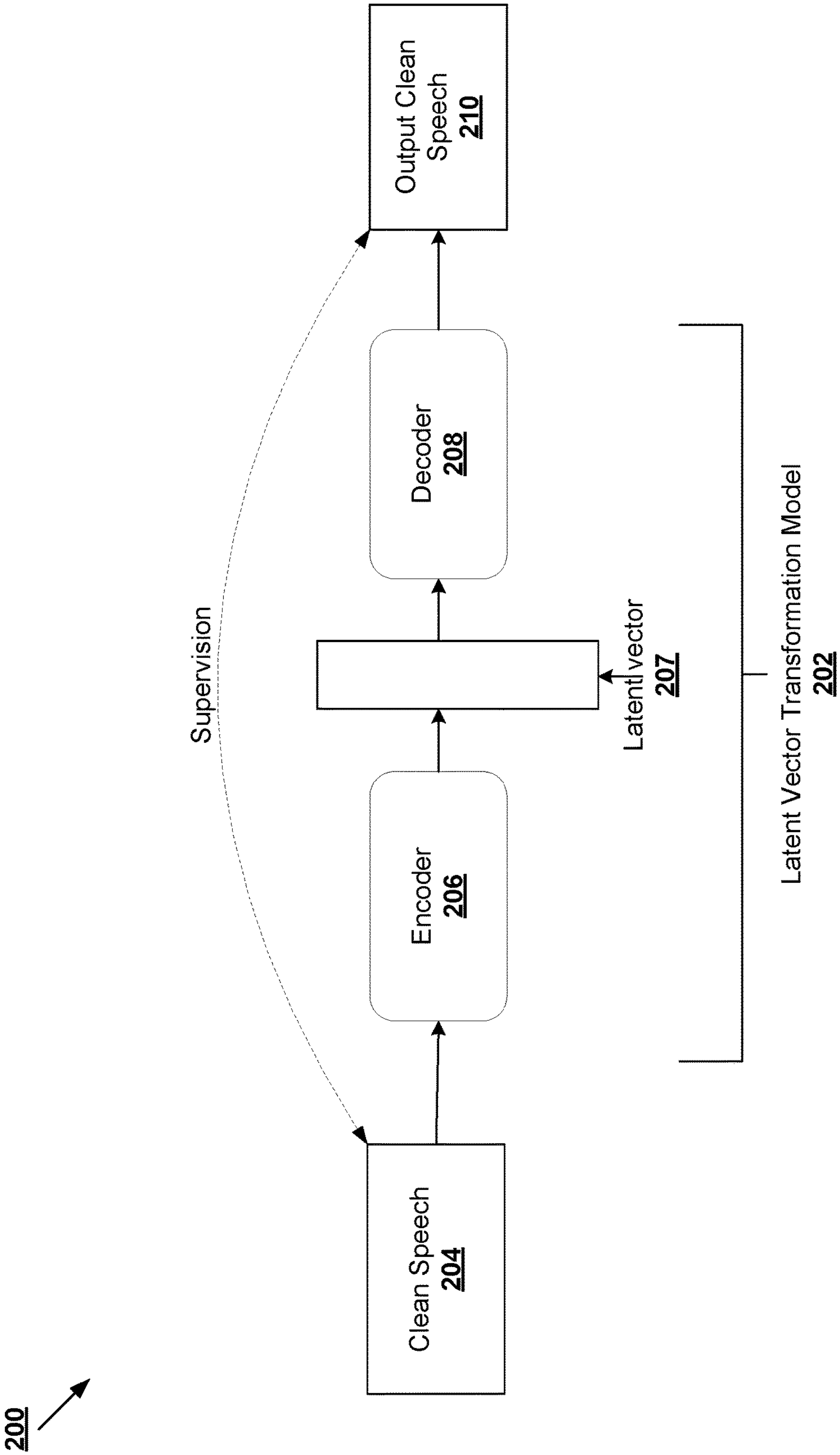
FIG. 6 illustrates an example architecture for an initial stage of training a latent vector transformation model to generate an enhanced audio file.

FIG. 6 illustrates an example architecture 200 for an initial stage of training a latent vector transformation model 202 to generate an enhanced audio file. In some embodiments, a subsequent stage (illustrated and described in reference to FIG. 7) is performed after completing the initial stage.

Initially the latent vector transformation model 202 is trained on clean speech 204. The encoder 206 maps the clean audio to a latent vector 207 of audio features. The decoder uses the latent vector 207 to reconstruct the audio and output clean speech 210. By encoding and decoding features the latent vector transformation model 202 learns which speech features are relevant (e.g., features such as pitch, volume, timbre, etc.) and the decoder 208 learns how to generate speech when given these audio features. The encoder 206 learns which weights to apply to which features to encode the latent vector 207 and the decoder 208 learns which weights to use to decode the latent vector 207. The latent vector transformation model 202 is able to freely identify audio features in the latent space. After the model learns to encode and decode these features such that the differences between the clean speech 204 and the output clean speech 210 is below a threshold the initial stage of training the latent vector transformation model 202 is complete.

Figure 7:
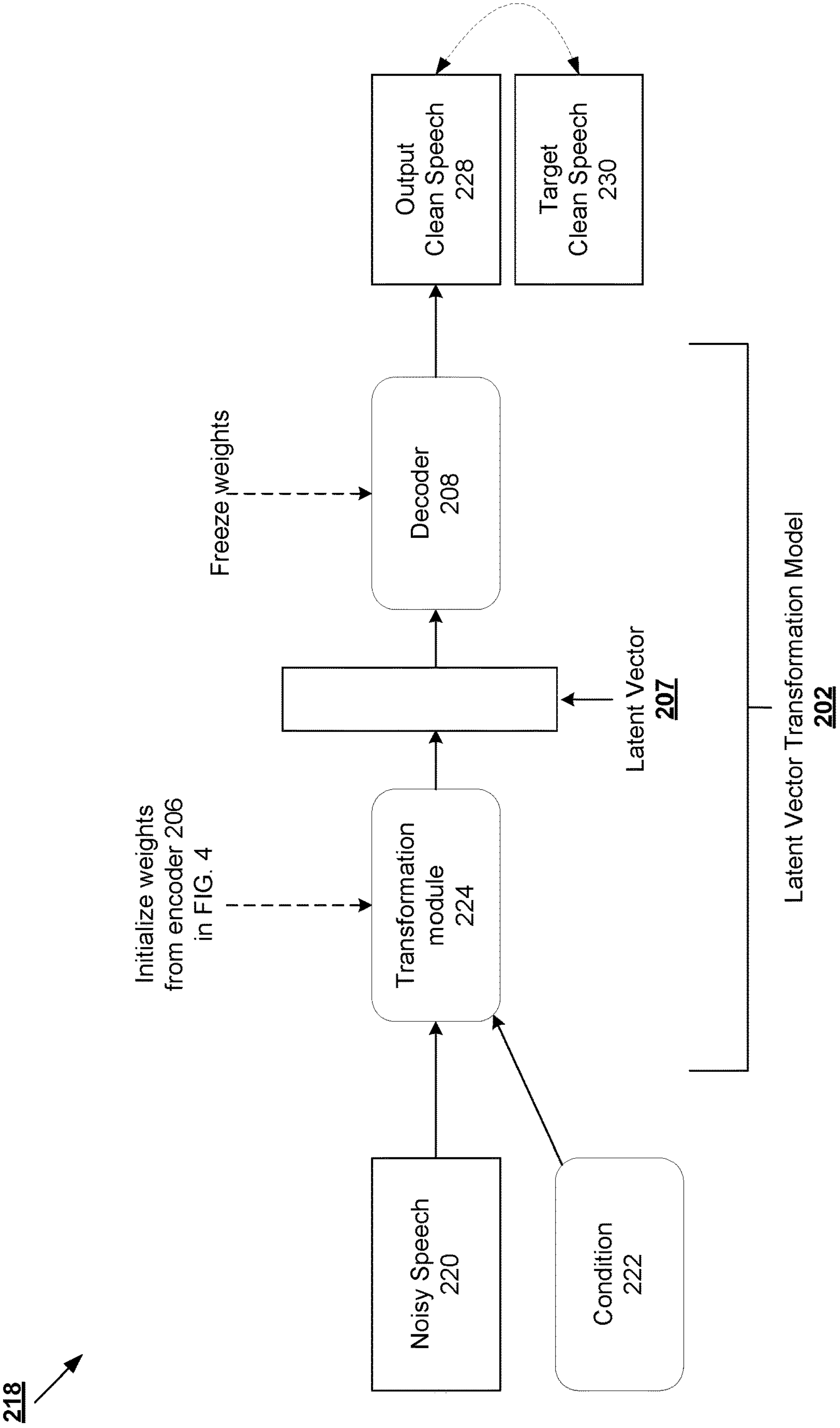
FIG. 7 illustrates an example architecture for a subsequent stage of training a latent vector transformation model to generate an enhanced audio file.

FIG. 7 illustrates an example architecture 218 for a subsequent stage of training a latent vector transformation model 202 to generate an enhanced audio file. The subsequent stage is performed after the completion of the initial stage illustrated and described in reference to FIG. 6.

At the subsequent stage, the transformer is initialized with the weights for encoding audio features in a latent vector from the encoder 206 as described in FIG. 6. The weights for the decoder 208 as trained in FIG. 6 are frozen. In some embodiments, the latent vector transformation model 202 is further trained at this stage using a noisy speech training example 220 and a paired target clean speech training example 230. The noisy speech training example 220 is provided to the transformation module 224. In some embodiments, the transformation module 224 receives a condition 222 input to condition the transformed based on known features. For example, the transformation module 224 may receive a condition 222 input which indicates that recording was performed on a specific device (e.g., a type of phone) or using certain hardware (e.g., a Bluetooth microphone). In some embodiments, the condition 222 input indicates a noise type present in the input audio file. For example, data associated with noisy speech may be used to condition the transformation module 224 to learn how to decode audio features with different types of noise. The transformation module 224 learns to map the noisy speech training example 220 into the latent vector 207 in a way that the decoder 208 can reconstruct clean speech which is output as output clean speech 228. The output clean speech 228 is compared with the target clean speech training example 230 to supervise the training of the transformation module.

Advantages of training the latent vector transformation model 202 over these two stages include lowering the number of paired samples of noisy speech training example 220 and target clean speech training example 230 required to train the transformation module 224 as the decoder 208 is trained at a separate stage which can use unpaired samples of clean speech. Additionally, the decoder learns to reconstruct output on a lot of clean samples improving the performance of the decoder 208. In some embodiments, the latent vector transformation model 202 is used to map latent features in reference to some of the embodiments illustrated and described in FIGS. 2 through 5.

In some embodiments, the paired noisy speech and clean training examples used for training the transformation module 224 can be artificially generated by reducing the quality of clean speech training examples. For example, a clean speech training example can be down sampled, encoded to a lossy audio format (decoding to a lossy format such as MP3), randomly adjusting audio overtime, identifying time periods in the sample with "ess" sounds and/or "p" sounds and adjusting the volume at these time periods, overdriving the signal, applying equalization curves to simulate bad microphones/recording conditions, adding reverberation, mixing with different kinds of background noises (mouth noise, street hum, wind, etc.).

Figure 8:
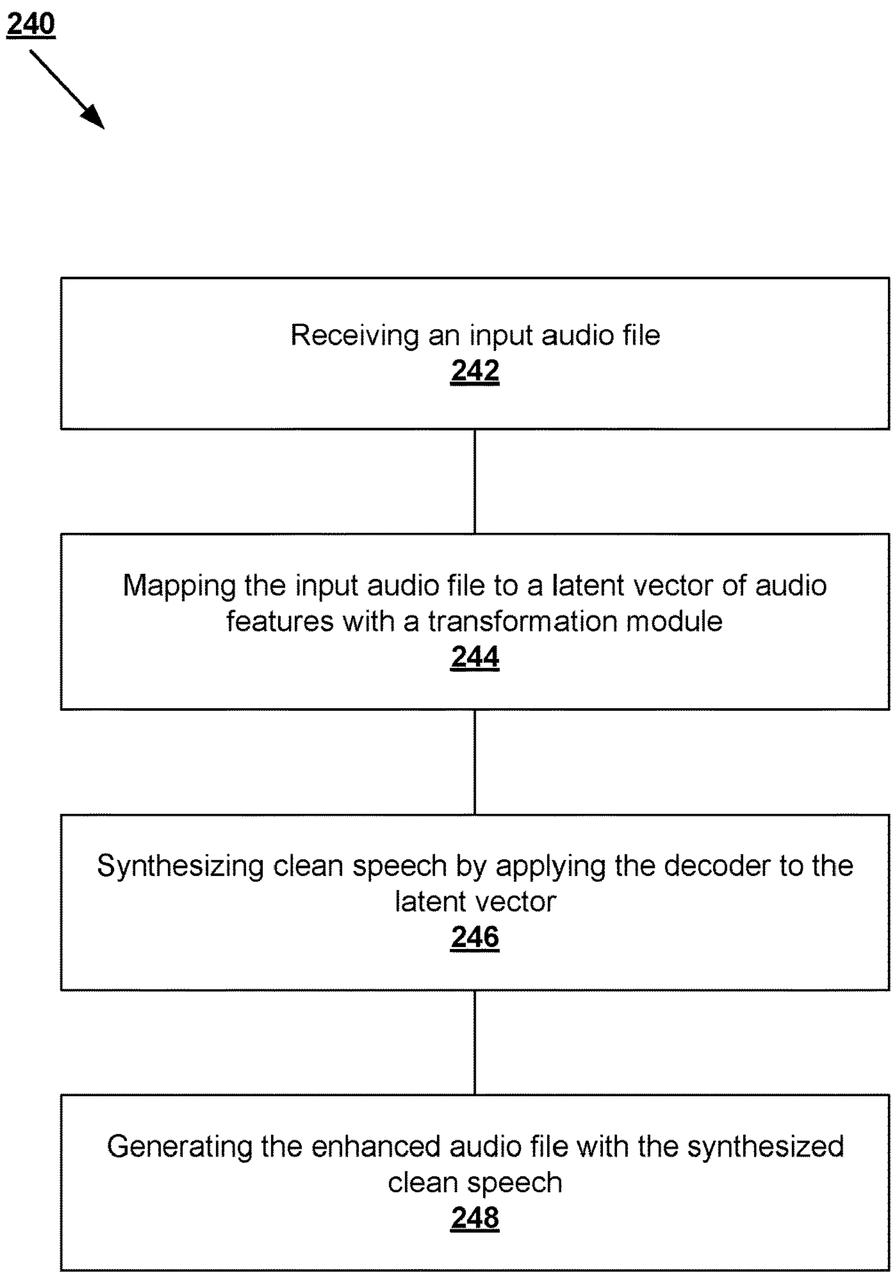
FIG. 8 illustrates an example method for enhancing input speech in an input audio file.

FIG. 8 illustrates an example method 240 for enhancing input speech in an input audio file. The method 240 includes the operations 242, 244, 246, and 248.

The operation 242 receives an input audio file. In some embodiments, the input audio file includes audio data representing input speech. In some embodiments, the input speech is recorded at an audio recording device.

In some embodiments, the operations 244, 246, and 248 are part of a step for generating an enhanced audio file by applying an audio transformation model to the input audio file. In some embodiments, the audio transformation model is trained using the method 260 illustrated and described in reference to FIG. 9.

The operation 244 maps the input audio file to a latent vector of audio features with a transformation module. In some embodiments, the audio transformation model comprises a transformation module that is trained to perform the mapping of the input audio file to the latent vector based on a decoder being enable to synthesize clean speech from the latent vector.

The operation 246 synthesizes clean speech by applying the decoder to the latent vector. The decoder decodes the latent vector to audio data with speech. In some embodiments, the decoder is trained to synthesize clean speech by training an encoder to map clean speech training examples on the latent vector and training the decoder to reconstruct the clean speech training examples (e.g., the operation 262 of the example method 260 illustrated and describe in reference to FIG. 9). In some embodiments, the clean speech is synthesized without referencing the input audio file. In some embodiments, the audio transformation model accounts for input recording environment data of the audio recording device.

The operation 248 generates the enhanced audio file with the synthesized clean speech. In some embodiments, the enhanced audio file is generated without referencing the input audio file. In some embodiments, the enhanced audio file is the enhanced audio file 110 illustrated and described in reference to FIG. 1.

In some embodiments, an audio recording device comprising, a processor in communication with a microphone and a memory storing instructions, which when executed by the processor cause the audio recording device to perform the method 240. In some embodiments, method 240 is performed entirely on the audio recording device. In some embodiments, the method 240 is performed in real-time a s a user records audio at the audio recording device. In some embodiments, A non-transitory computer-readable medium having stored thereon instructions which, when executed by one or more processors, cause the one or more processors to perform the method 240.

Figure 9:
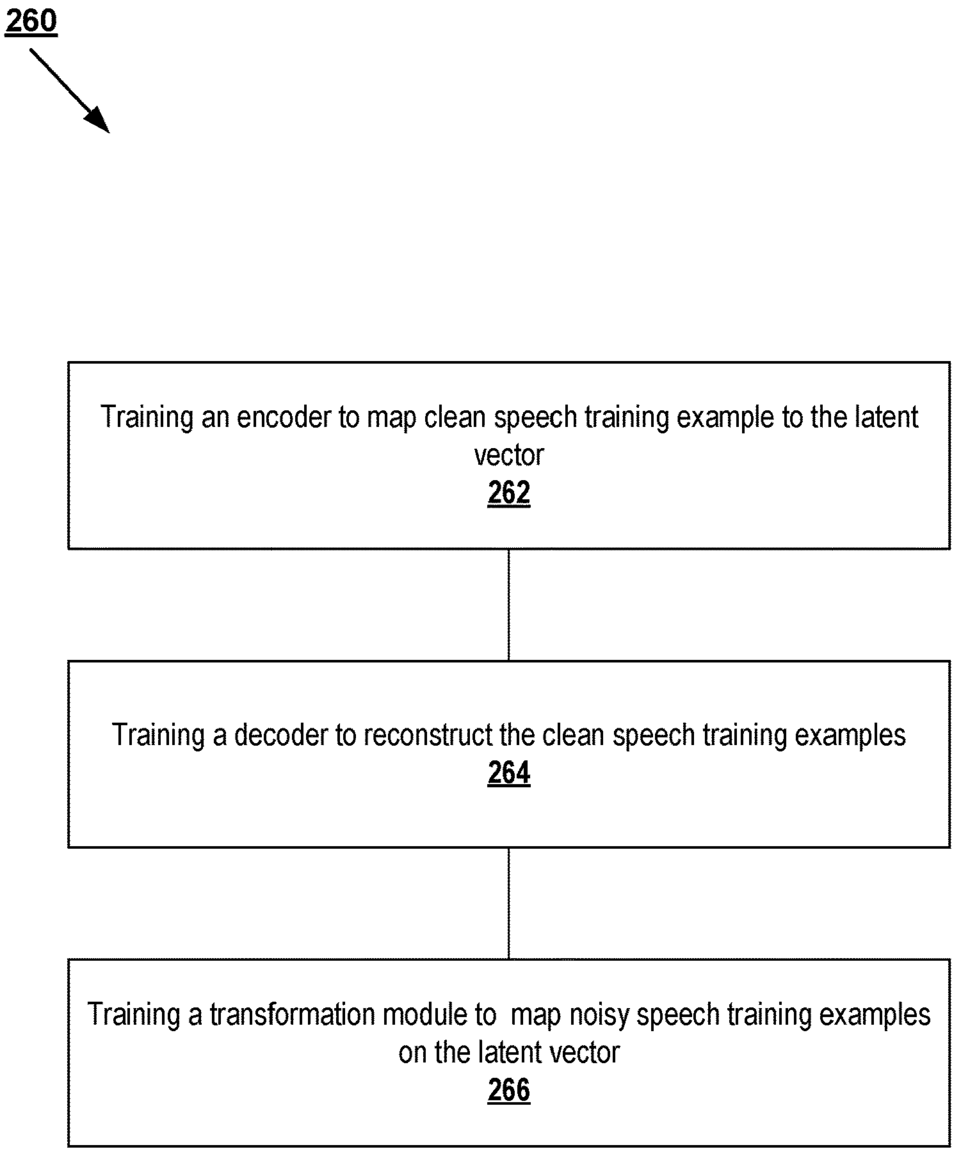
FIG. 9 illustrates an example method for training a latent vector transformation module.

FIG. 9 illustrates an example method 260 for training a latent vector transformation module. In some embodiments, the latent vector transformation module is the audio transformation model applied in the method 240 as shown in FIG. 8. The method 260 includes the operations 262, 264, and 266.

The operation 262 trains an encoder to map clean speech training examples to the latent vector and the operation 264 trains a decoder to reconstruct the clean speech training examples. In some embodiments, the operations 262 and 264 are sequentially performed multiple times in order to train the decoder to reconstruct speech. For example, as illustrated and described in the example architecture illustrated and described in reference to FIG. 6. In some embodiments, the decoder is trained prior to the training of the transformation module and the decoder is used for training the transformation module at the operation 266.

The operation 266 trains a transformation module to map noisy speech training examples on the latent vector. An example architecture for the operation 266 is illustrated and described in reference to FIG. 7. In some embodiments, training the transformation module comprises training the transformation module to map noisy speech training examples on the latent vector such that the decoder reconstructs clean speech output matching clean speech training examples paired with the noisy speech training examples. In some embodiments, the noisy speech training examples are artificially produced from the paired clean speech training examples. In some embodiments, the clean speech training examples include speech which was professionally recorded and mixed.

3. Enhanced Audio File Generator Applications

Figure 10:
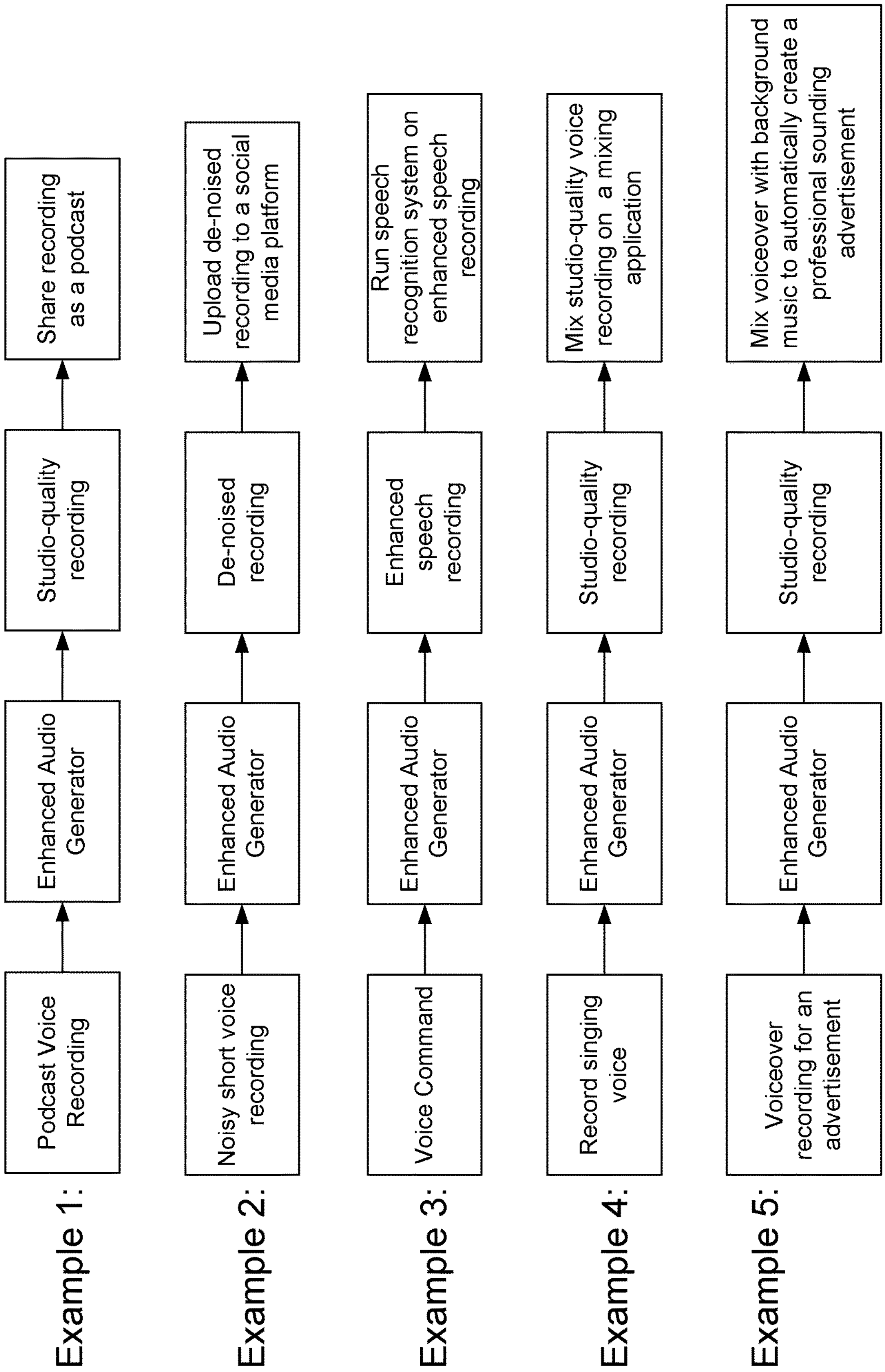
FIG. 10 illustrates example applications for the enhanced audio file generator.

FIG. 10 illustrates example applications for the enhanced audio file generator. Many other examples are described herein or are included within the scope of the disclosure.

Example 1 illustrates a user generating a studio-quality podcast. The user can record the podcast anywhere, including noisy environments and process the recording with the enhanced audio generator to generate a studio-quality recording which can be uploaded and shared with listeners of the podcast.

Example 2 illustrates an example of uploading a short clip to a social media platform. In some embodiments, a podcaster may want to interact with listeners. In this example, the users can upload enhanced audio files which reduces the amount of time required to integrate the user submitted content into podcasts. Additionally, the podcaster can use more user submitted content because the content will be of a sufficiently high quality. In the example shown, the noisy short voice recording is provided to the enhanced audio generator which generates a de-noised recording which the user can upload to a social media platform.

Example 3 illustrates a use case with a speech recognition system (e.g., a voice command device or a voice assistant). For example, a user may provide a voice command with a lot of noise (e.g., due to environmental sounds or a microphone issue) and the enhanced audio generator and generate an enhanced speech recording which allows the voice assistant to improve the accuracy and processing speed for processing the voice command at a speech recognition system.

Example 4 illustrates an example for recording and generating a studio quality recording for a song. In some embodiments, an enhanced audio generator is integrated in a mixing application which allows a user to mix studio quality voice recordings with music.

Example 5 illustrates an example for producing a professional sounding advertisement. The user provides a voice over recording for an advertisement and the enhanced audio generator generates a studio-quality recording. In some embodiments, the enhanced audio generator is built into a mixing application which allows a user to add background music to quickly create a professional sounding advertisement.

Further example applications of the enhanced audio file generator include: (1) speech denoising (e.g., replace background noise component with silence before synthesis) (2) studio quality recording generation; (3) voice beautification (e.g., replace voice timbre and pitch salience components with ones transformed by a different neural network); (4) voice swapping (e.g., replace the voice timbre component with the voice timbre component produced by the speech analyzer for a different voice recording); (5) accent swapping (e.g., replace the pitch salience and phoneme components with ones transformed by a different neural network); (6) voice anonymization (replace the voice timbre component with the voice timbre component produced by the speech analyzer for a different voice recording, e.g., by swapping these features with a voice that does not sound like the user or a random voice); (7) explicit word scrubber (e.g., by identifying explicit words/sounds using a separate model, and remove-set to zero—or replace these words/sounds, before synthesis); (8) word removal or sound removal (e.g., by identifying words/sounds and removing these sounds as part of the enhanced file generation); (9) speech to singing or singing to speech application (e.g., replace the pitch salience component with one generated by another model); (10) age morphing (e.g., replace the voice timbre and pitch salience components with one generated by another model; and (11) nonhuman voice morphing (e.g., replace the voice timbre, pitch salience, and phoneme components with ones generated by another model).

Figure 11:
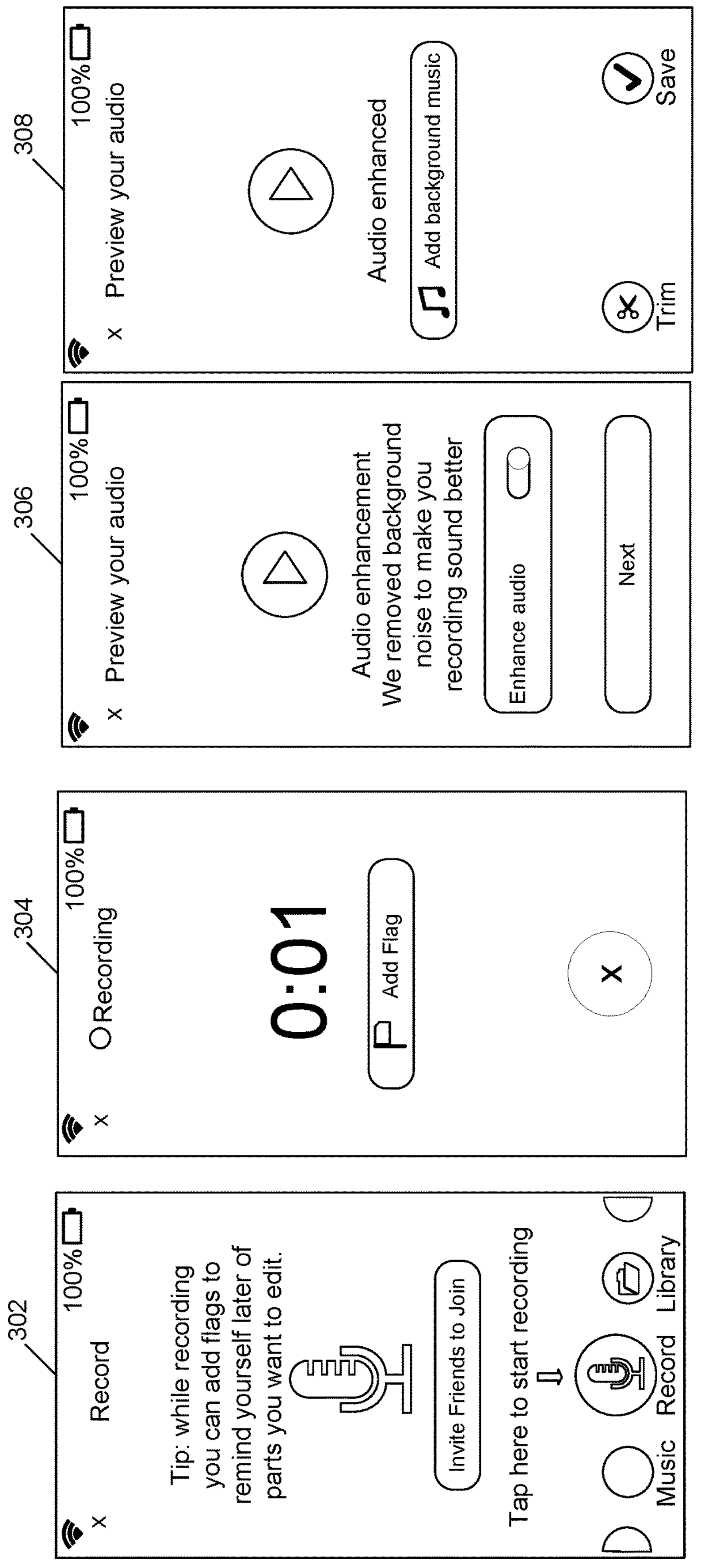
FIG. 11 illustrates example user interfaces for an application which uses the enhanced audio file generator.

FIG. 11 illustrates example user interfaces for an application which uses the enhanced audio file generator. The user interface 302 is presented as part of an application which lets users record audio. The user interface 304 is presented to a user while the recording is active. In some embodiments, the enhanced audio generator automatically generates enhanced audio as the user records. Because the enhanced audio generator can process audio faster than the audio is recorded, in some embodiments, the enhanced audio file is generated in real time. However, in the embodiment shown at the user interface 306 the user selects a setting for enhanced audio after the recording is complete. The user can set the audio enhancement setting with a single selection. In alternative embodiments, the enhanced audio selection is presented on the user interface 302 to process the original audio file in real time. The user interface 308 is presented to a user after the audio enhancement is complete. The user interface 308 includes a selection to add background music. This can allow the user to quickly generate professional sounding audio (e.g., songs, podcasts, audio advertisements, etc.).

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a CPU typically includes software resident on a storage media (e.g., a disk drive or memory card), which, when executed, directs the CPU in performing transmission and reception functions. The CPU software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include multiple separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein. Furthermore, it is common in the art to speak of software, in one form or another (e.g., program, procedure, process, service, application, module, unit, logic, and so on) as taking an action or causing a result. Such expressions are merely a shorthand way of stating that the execution of the software by a processing system causes the processor to perform an action to produce a result.

While various example embodiments have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

What is claimed is:

1. A method of enhancing input speech in an input audio file, the method comprising:

receiving the input audio file representing the input speech, wherein the input audio file is recorded at an audio recording device; and generating an enhanced audio file by applying an audio transformation model to the input audio file, wherein applying the audio transformation model to generate the enhanced audio file comprises:

mapping the input audio file to a latent vector of audio features, wherein the audio transformation model comprises a transformation module that is trained to perform the mapping of the input audio file to the latent vector based on a decoder being enabled to synthesize clean speech from the latent vector, wherein the mapping is based on first weights learned by an encoder;

synthesizing the clean speech by applying the decoder to the latent vector, wherein the synthesis is based on second weights learned by the decoder; and generating the enhanced audio file with the clean speech.

2. The method of claim 1, wherein the decoder is trained to synthesize clean speech by:

training the encoder to map clean speech training examples on the latent vector and training the decoder to reconstruct the clean speech training examples.

3. The method of claim 2, wherein training the transformation module comprises:

training the transformation module to map noisy speech training examples on the latent vector such that the decoder reconstructs clean speech output matching the clean speech training examples paired with the noisy speech training examples.

4. The method of claim 3, wherein the decoder is trained prior to the training of the transformation module and is used for the training of the transformation module.

5. The method of claim 3, wherein the noisy speech training examples are artificially produced from the paired clean speech training examples.

6. The method of claim 1, wherein the generating of the enhanced audio file is performed without referencing the input audio file.

7. An audio recording device comprising:

a processor in communication with a microphone; and a memory storing instructions, which when executed by the processor cause the audio recording device to:

record an input audio file to capture speech via the microphone; and generate an enhanced audio file by applying an audio transformation model to the input audio file, wherein to generate the enhanced audio file by applying the audio transformation model includes to:

map the input audio file to a latent vector of audio features, wherein the audio transformation model comprises a transformation module that is trained to map the input audio file to the latent vector based on a decoder being enabled to synthesize clean speech from the latent vector, wherein the mapping is based on first weights learned by an encoder;

synthesize the clean speech by applying the decoder to the latent vector, wherein the synthesis is based on second weights learned by the decoder; and generate the enhanced audio file with the clean speech.

8. The method of claim 1, wherein the method is performed entirely on the audio recording device.

9. The method of claim 1, wherein the method is performed in real-time as a user records audio on the audio recording device.

10. The method of claim 1, wherein the transformation module receives a condition input based on known features, the known features comprising hardware used to record the input audio file or a noise type present in the input audio file.

11. The method of claim 1, wherein the audio transformation model accounts for input recording environment data of the audio recording device.

12. The method of claim 1, wherein the enhanced audio file is used as an input to a speech recognition system.

13. The audio recording device of claim 7, wherein the enhanced audio file is generated without referencing the input audio file.

14. The audio recording device of claim 7, wherein the enhanced audio file is generated in real-time as a user records audio on the audio recording device.

15. The audio recording device of claim 7, wherein the transformation module receives a condition input based on known features, the known features comprising hardware used to record the input audio file and a noise type present in the input audio file.

16. The audio recording device of claim 7, wherein the audio transformation model accounts for input recording environment data of the audio recording device.

17. The audio recording device of claim 7, wherein the decoder is trained to synthesize clean speech by:

training the encoder to map clean speech training examples on the latent vector and training the decoder to reconstruct the clean speech training examples.

18. The audio recording device of claim 17, wherein training the transformation module comprises:

training the transformation module to map noisy speech training examples on the latent vector such that the decoder reconstructs clean speech output matching the clean speech training examples paired with the noisy speech training examples.

19. The audio recording device of claim 18, wherein the decoder is trained prior to the training of the transformation module and is used for the training of the transformation module.

20. The audio recording device of claim 18, wherein the noisy speech training examples are artificially produced from the paired clean speech training examples.

* * * * *